Feb. 19, 1924. 1,484,590
J. M. VAN HEUSEN
COLLAR
Filed June 26, 1922 4 Sheets-Sheet 1
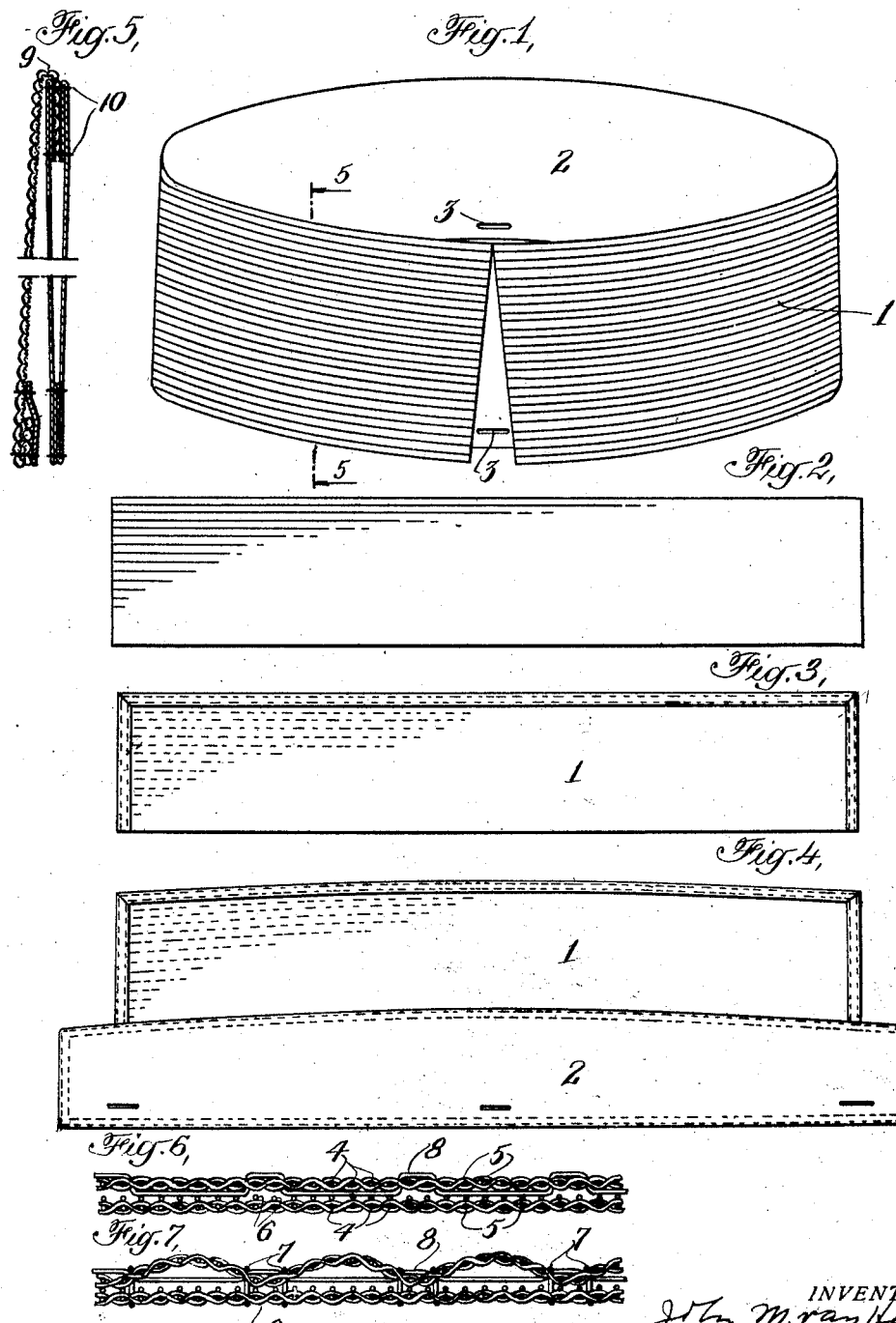

Feb. 19, 1924. 1,484,590
J. M. VAN HEUSEN
COLLAR
Filed June 26, 1922 4 Sheets-Sheet 2
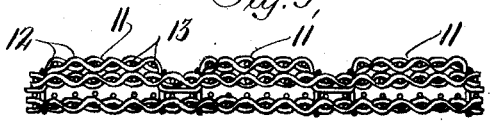
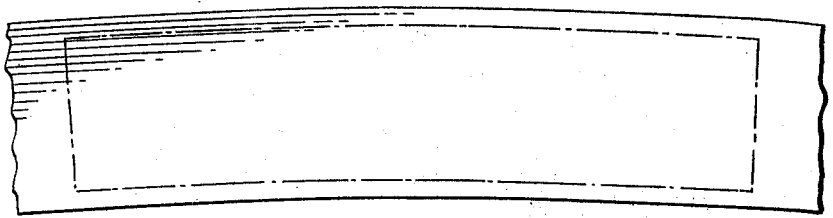
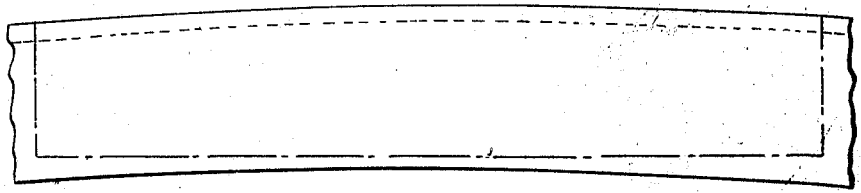
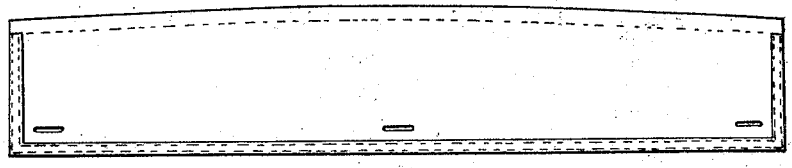
INVENTOR
John M. van Heusen
BY Merrell E. Clark
ATTORNEY Feb. 19, 1924.  1,484,590
J. M. VAN HEUSEN
COLLAR
Filed June 26, 1922  4 Sheets-Sheet 3
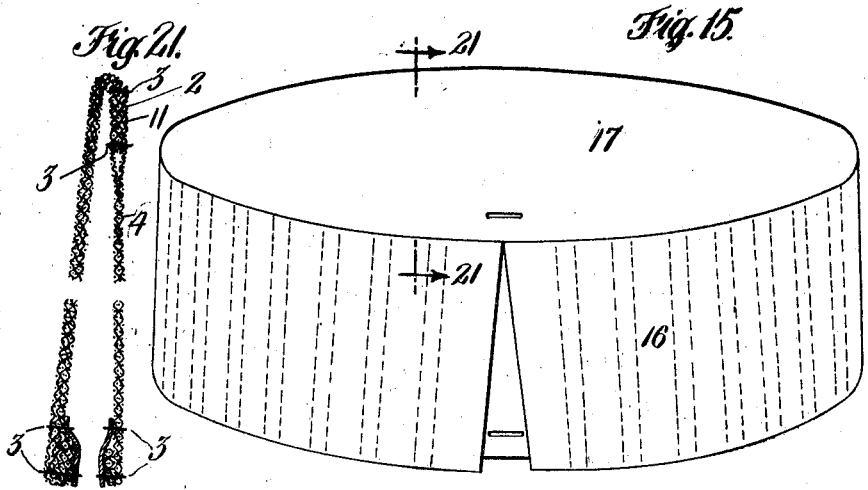
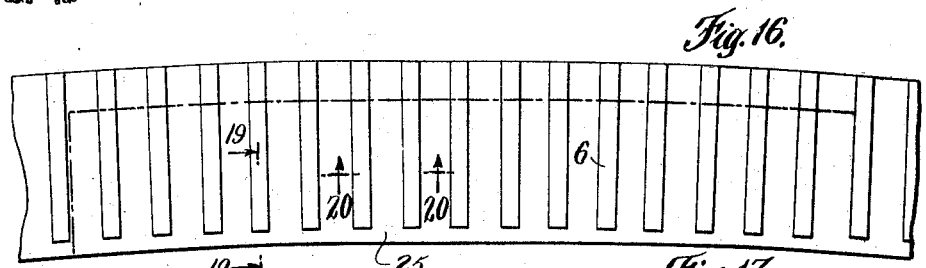
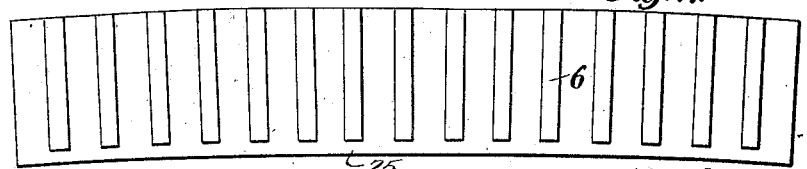
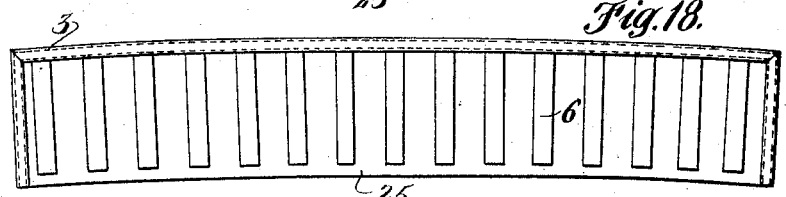
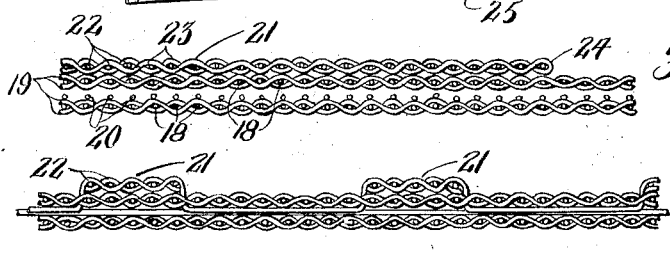
INVENTOR
BY
ATTORNEY

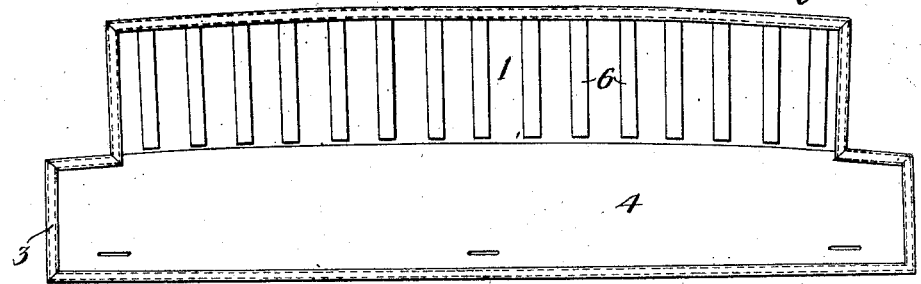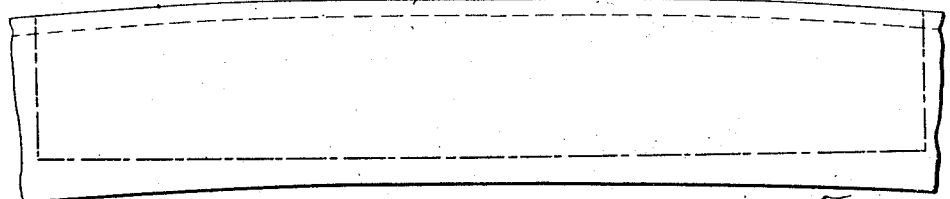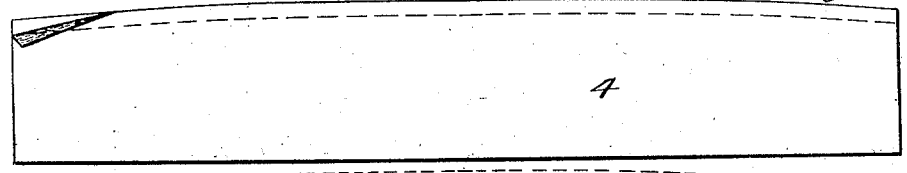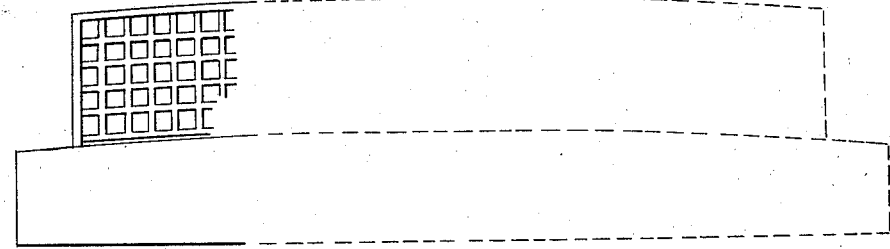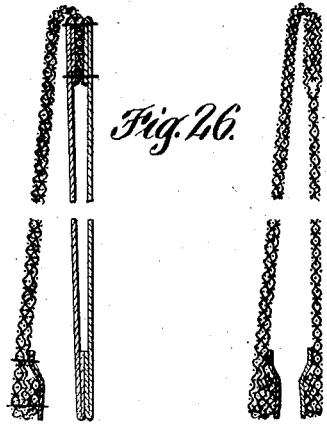

Patented Feb. 19, 1924.

1,484,590

UNITED STATES PATENT OFFICE.

JOHN M. van HEUSEN, OF BOSTON, MASSACHUSETTS, ASSIGNOR TO VAN HEUSEN PRODUCTS, INC., A CORPORATION OF DELAWARE.

COLLAR.

Application filed June 26, 1922. Serial No. 570,909.

*To all whom it may concern:*

Be it known that I, JOHN M. VAN HEUSEN, a citizen of the United States, and a resident of Boston, county of Suffolk, and State of Massachusetts, have invented certain new and useful Improvements in Collars, of which the following is a specification.

This invention relates to improvements in folding or turn down collars adapted to be worn without starching, and more particularly to collars of the built-up type made in whole or in part of heavy fabric such as multiple ply interwoven fabric.

In my copending application, Serial No. 531,757, filed January 25, 1922, I describe and illustrate numerous fabrics made up of a plurality of layers or plies integrally bound together during the weaving operation by interweave or binder threads, the said fabrics having woven therein ribs or bars both lengthwise and crosswise of the fabric, and various other modifications and weaves which tend to stiffen and reinforce the fabric and also present a pleasing and distinctive appearance. In the said application I claim broadly collars made of the fabrics described, and others of similar nature and appearance, and I claim specifically collars constructed of one piece of the same or similar fabrics.

The present invention relates to collars of the "built-up" type, made in whole or in part of the fabric described in the above mentioned copending application, or of fabrics of a similar nature and construction. That is, the fabric of which at least part of the collar is made is a relatively heavy unitary fabric, such, for example, as a multiple ply interwoven fabric. Fabrics of this kind have a considerable degree of inherent stiffness and set, such that collars made therefrom will, in an unstarched condition, retain their shape and form and will present a neat and pleasing appearance.

Fabrics of the type above described are relatively thick and stiff and consequently do not fold or crease easily. In the manufacture of collars made up of one or more pieces of this fabric, it has been found desirable, if not absolutely necessary, to predetermine and indicate definitely the line along which the turn down portion of the collar is to fold. This may be done by weakening the fabric along the line of fold either in the weaving operation or by subsequent mechanical or chemical treatment. Again, the fabric may be reinforced along a line adjacent to the desired line of fold of the collar, thus providing a portion of increased stiffness and thickness along which the collar will fold.

In accordance with one embodiment of the present invention I provide collars made in whole or in part of relatively heavy fabric, the said fabric having woven on at least one side thereof a series of transverse ribs or bars, the said ribs or bars extending up to and terminating at the fold line of the collar. The transverse ribs which are woven at the same time as, and are integral with, the fabric thus fulfill, among others, three distinct objects, namely, the fold portion of the collar is determined by the termination of the series of transverse ribs at the junction of the neckband and turn down portions; the collar is stiffened and reinforced by the said transverse ribs and will consequently resist any tendency to wrinkle or crush when worn; and the collar, if the said ribs are woven on the exposed surface of the turn down portion, is provided with a distinctive and pleasing appearance.

In accordance with another embodiment of my invention, I provide collars made in whole or in part of relatively heavy fabric having woven on at least one side thereof a series of longitudinal ribs or bars, the said ribs or bars being woven relatively close together and the fold portion of the collar being determined by the groove or depression between two of the said ribs at the junction of the neckband and turn down portions. The longitudinal ribs thus provide similar advantages to those afforded by the transverse ribs described in the preceding paragraph, i. e., the fold portion of the collar is indicated between two of the said ribs, the collar is stiffened and strengthened by them, and their presence on the exposed surface of the turn down portion gives to the collar a distinctive and pleasing appearance.

The invention will be further described in connection with the drawing, in which Fig. 1 is a perspective view of a collar provided with longitudinal ribs on the turn down portion thereof.

Fig. 2 is a plan view of the turn down portion of the collar of Fig. 1.

Fig. 3 is a plan view of the turn down portion of the collar of Fig. 1, the exposed edges of which are bound.

Fig. 4 is a plan view of the collar of Fig. 1 laid out flat.

Fig. 5 is an enlarged sectional view taken on the line 5—5 of Fig. 1 and showing conventionally the construction of the collar.

Fig. 6 is an enlarged sectional view taken transversely of the fabric and showing conventionally one weave of a ribbed fabric.

Fig. 7 is an enlarged sectional view similar to Fig. 6 showing more exactly the actual contour of the fabric after it is woven.

Fig. 8 is an enlarged sectional view showing conventionally a folded collar, the outer portion having a modified weave.

Fig. 9 is an enlarged sectional view taken transversely of the fabric and showing conventionally a modified weave of the fabric.

Fig. 10 is a plan view of a strip of fabric woven curvilinear showing how the outer portion may be cut therefrom.

Fig. 11 is a plan view of a strip of fabric from which the neckband portion may be cut.

Fig. 12 is a plan view of a neckband portion completed.

Fig. 13 is an enlarged sectional view taken transversely of the fabric and showing conventionally another weave of a ribbed fabric.

Fig. 14 is an enlarged sectional view showing conventionally a modification of the construction of Fig. 5.

Fig. 15 is a perspective view of a collar having on the turn down portion thereof a series of transverse ribs.

Fig. 16 is a plan view of a strip of fabric from which the turn down portion may be cut.

Fig. 17 is a plan view of the turn down portion.

Fig. 18 is a plan view of the turn down portion, the exposed edges of which have been bound.

Fig. 19 is an enlarged sectional view taken along the line 19—19 of Fig. 16 and showing conventionally the weave.

Fig. 20 is an enlarged sectional view taken along the line 20—20 of Fig. 16 and showing conventionally the weave.

Fig. 21 is an enlarged sectional view taken on the line 21—21 of Fig. 15 and showing conventionally the construction of the collar.

Fig. 22 is a plan view of the collar of Fig. 15 laid out flat.

Fig. 23 is a plan view of a strip of fabric from which the neckband may be cut.

Fig. 24 is a plan view of a neckband after being cut from the strip of fabric.

Fig. 25 is an enlarged sectional view of a collar showing a modification of the construction of Fig. 21.

Fig. 26 is an enlarged sectional view of a collar showing another modification of the construction of Fig. 21.

Fig. 27 is a plan view of a collar having both transverse and longitudinal ribs.

The collars of the present invention are, as above stated, of the "built up" type, that is, the neckband portion and the turn down portion of the collar are made separately and united together.

Figs. 1 to 14 illustrate collars made in whole or in part of heavy unitary fabric having woven on the turn down portion thereof a series of longitudinal ribs. In these figures, 1 is the turn down portion, 2 is the neckband portion, the said neckband portion being provided with the customary buttonholes 3.

Figs. 6 and 7 show one suitable weave by which the ribbed fabric may be woven. The fabric illustrated is woven with two sets of warp threads 4 interwoven with weft threads 5 to form two separate plies of fabric, these plies being separated by an intermediate filler thread layer 6 and integrally bound together by the interweave threads 7 (see Fig. 7). An additional series of weft threads 8 is woven into the upper ply of the fabric, this weft thread passing over two or more of the warp threads and then passing between the two layers of fabric and under a plurality of warp threads of the upper ply. These weft threads woven into the fabric as described, will produce a pleasing and novel design in the fabric. The interweave threads 7 are placed so as to bind the fabric together at the portions adjacent to the places where the weft threads 8 come to the surface of the fabric, and are omitted at the intermediate portions. The presence of the said interweave threads and the weft threads 8, both tending to draw the upper ply of the fabric down, will have a tendency to cause the intermediate portions to bulge slightly as illustrated in Fig. 7. The fabric woven as described will present a pleasing and distinctive appearance and, furthermore, will be substantially stiffened at the portions 9 of Fig. 7 by the interweave threads 7 and the weft threads 8.

The fabric described may be woven straight as shown in Fig. 2, or it may be woven curvilinear as described in Patent No. 1,254,339 to John L. Morgan. If straight fabric is used in making the turn down portion of the collar, the neckband portion may advantageously be constructed with its upper edge curvilinear as shown in Fig. 4, and the straight upper edge of the turn down portion may be attached to the neckband so that it will conform to the curvilinear upper edge of the neckband. The collar will in this way have a tendency to curl when folded and the fold line thereof will be determined by the portion 9 shown in Figs. 5 and 7 which is more closely woven than the raised intermediate portions and along which the collar will tend to fold.

The outer edges of the turn down portion may be turned, overlaid with tape and secured by two rows of stitches as illustrated in Figs. 3 and 4 and more fully described in my Patent No. 1,254,294. The neckband portion 2 may be made up of two separate pieces of fabric, the edges of which are turned in and stitched as shown in Figs. 4 and 5, and the upper edge of the turn down portion may be inserted between the said layers of fabric and the upper edge of the neckband and secured by stitches 10.

Fig. 9 shows in a diagrammatical and conventional manner another suitable weave of a fabric having a series of longitudinal ribs therein. The ribs 11 are made up of an additional ply of fabric interwoven with the main body of the fabric and may if desired be placed relatively close together so as to present an appearance comparable to that of a "whipcord" or pique fabric. The weft threads 12 which are woven with warp threads 13 to form the ribs 11, pass between the layers of the main portion of the fabric at the intermediate portions between the said ribs.

An enlarged sectional view of a collar, the turn down portion of which is made of the fabric of Fig. 9 is shown in Fig. 8. As will be noted, the fold portion 14 of the collar occurs at the intermediate portion between two of the ribs.

Fig. 13 shows in a conventional manner still another weave which is suitable for the purposes of the present invention. As will be obvious from the figure, the fabric consists of two layers of fabric and an intermediate filler thread layer, certain of the said filler threads being large cords 15 many times larger than the other threads making up the fabric, and spaced at regular intervals apart.

Figs. 10, 11, 12 and 14 show a collar the neckband portion of which is made up of multiple ply interwoven fabric, as distinguished from the neckbands shown in Figs. 5 and 8. This fabric may be woven curvilinear as shown in Fig. 10 and a divided edge may be provided along the upper edge of the neckband cut therefrom, as shown in Figs. 11, 12 and 14, so that the upper edge of the turn down portion may be inserted between the said divided edge and secured.

Figs. 15 to 25 illustrate collars made up in whole or in part of heavy unitary fabric having woven on the turn down portion thereof a series of transverse ribs. In these figures 16 is the turn down portion and 17 the neckband portion.

Figs. 19 and 20 illustrate one suitable weave with which the fabric may be made. In this fabric two sets of warp threads 18 are interwoven with weft threads 19 to form two separate plies of fabric, these plies being separated by an intermediate warp filler thread layer and the fabric being integrally bound together by interweave or binder threads (not shown). The rib 21 is comprised of a layer of warp threads 22 woven with weft threads 23 and integrally bound to the main portion by the interweave threads. It will be noted that near the edge of the fabric of Fig. 19 the ribs stop, a selvage edge 24 being provided at the end of each rib. As shown in Fig. 20, the warp threads 22 of the rib 21 pass between the layers or plies of the fabric, that is, alongside the filler thread layer at the intermediate points where the ribs are not woven in the fabric.

The fabric may advantageously be woven with a curvilinear weave as hereinbefore described and as illustrated in Fig. 16 so that the ends or terminations of the ribs 21 provide, when taken together, a generally curvilinear line along which the collar will naturally fold. So, also, the fabric may be woven straight, and the ribs may be made progressively of different lengths so that their ends will define a curvilinear fold line.

The turn down portion of the collar of Fig. 15 may be cut from the fabric of Fig. 16. It will be noted that the transverse ribs are positioned on the said turn down portion so that a narrow portion 25 of Figs. 16, 17, 18 is extending beyond the ends of the ribs by which the turn down portion may be attached to the neckband portion as illustrated in Fig. 21. As will be evident from Figs. 15 and 21, the transverse ribs are on the inside surface of the turn down portion so as not to be exposed to view when the collar is worn. These ribs will, nevertheless, serve to stiffen the neckband portion of the collar, and also to provide a natural curvilinear fold line for the collar. The edges of the collar may be turned, overlaid with tape and secured by two rows of stitching, as shown in Figs. 18, 21 and 22.

The neckband portion may be made of two or more separate layers of fabric, as shown in Fig. 26, or it may be constructed of multiple ply interwoven fabric as illustrated in Figs. 22, 23 and 24. As shown in these figures, the neckband is woven with a divided edge on the upper edge thereof so that the upper edge of the turn down portion may be inserted therebetween and secured by stitches as illustrated in Fig. 21.

The turn down portion may, if desired, be made so that the transverse ribs are on the outside exposed surface thereof. This construction is shown in Fig. 25. The collar will now present a pleasing and distinctive appearance.

Instead of weaving the fabric so that it has ribs running in but one direction, the fabric may be woven with both transverse and longitudinal ribs therein, as shown in Fig. 27, so that the fabric will have a checkered appearance, and also will be stiffened both lengthwise and crosswise of the fabric. When the fabric is woven in this way both the transverse ribs and the longitudinal ribs may be arranged to function in determining the fold line.

While I have illustrated collars having transverse and longitudinal ribs on the turn down portions only thereof, it will be understood that I do not limit myself to the embodiments shown. If desired, the neckband portion, instead of or in addition to the turn down portion, may be provided with ribs.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. A folding collar of the built-up type, made in whole or in part of semi-stiff fabric comprising a neckband portion and a turn-down portion, said collar having woven in at least one of said portions a plurality of relatively narrow thickened zones which tend to stiffen the collar and which are adapted to facilitate the folding of the collar along a longitudinal curvilinear line of fold.

2. A folding collar of the built-up type, made in whole or in part of multiple ply interwoven fabric comprising a neckband portion and a turn-down portion, said collar having woven in at least one of said portions a plurality of relatively narrow thickened zones which tend to stiffen the collar and which facilitate the folding of the collar along a longitudinal curvilinear line of fold.

3. A folding collar of the built-up type, made of two pieces of semi-stiff fabric comprising a neckband portion and a turn-down portion, said collar having woven in at least one of said portions a plurality of relatively narrow thickened zones which tend to stiffen the collar and which are adapted to facilitate the folding of the collar along a longitudinal curvilinear line of fold.

4. A folding collar of the built-up type, made of two pieces of multiple ply interwoven fabric comprising a neckband portion and a turn-down portion, said collar having woven in at least one of said portions a plurality of relatively narrow thickened zones which tend to stiffen the collar and which are adapted to facilitate the folding of the collar along a longitudinal curvilinear line of fold.

5. A folding collar of the built-up type, made in whole or in part of semi-stiff fabric comprising a neckband portion and a turn-down portion, said collar having in at least one of said portions a plurality of longitudinal curvilinear thickened zones which tend to stiffen the collar from the fold zone to the base of said collar and which provide between two of the said zones near the junction of the two portions a natural curvilinear line of fold of the collar.

6. A folding collar of the built-up type, made in whole or in part of multiple ply interwoven fabric comprising a neckband portion and a turn-down portion, said collar having in at least one of said portions a plurality of longitudinal curvilinear thickened zones which tend to stiffen the collar from the fold zone to the base of said collar and which provide between two of the said zones near the junction of the two portions a natural curvilinear line of fold of the collar.

7. A folding collar of the built-up type, made in whole or in part of semi-stiff fabric comprising a neckband portion and a turn-down portion, said collar having woven in the turn-down portion thereof a series of narrow curvilinear thickened and stiffened zones running longitudinally of the fabric and the curve being such, that at the transverse center line of the collar, each of the said zones departs at least $\frac{1}{4}''$ from a straight line connecting its ends; the said series of thickened and stiffened zones stiffening the collar across the entire outer face thereof and providing, between the two said zones near the junction of the neckband and turn-down portions, a curvilinear fold portion along which the collar will naturally fold.

8. A folding collar of the built-up type, made in whole or in part of multiple ply interwoven fabric comprising a neckband portion and a turn-down portion, said collar having woven in the turn-down portion thereof a series of narrow curvilinear thickened and stiffened zones running longitudinally of the fabric and the curve being such, that at the transverse center line of the collar, each of the said zones departs at least $\frac{1}{4}''$ from a straight line connecting its ends; the said series of thickened and stiffened zones stiffening the collar across the entire outer face thereof and providing, between the two said zones near the junction of the neckband and turn-down portions, a curvilinear fold portion along which the collar will naturally fold.

JOHN M. van HEUSEN.